United States Patent [19]
Sabbara

[11] Patent Number: 5,483,923
[45] Date of Patent: Jan. 16, 1996

[54] TIMER CONTROLLED PET FEEDER

[76] Inventor: Samir M. Sabbara, 3348 Deerwood Dr., Anaheim, Calif. 92804

[21] Appl. No.: 270,904

[22] Filed: Jun. 30, 1994

[51] Int. Cl.⁶ ..................................................... A01K 5/02
[52] U.S. Cl. ........................................ 119/51.11; 119/56.1
[58] Field of Search ........................... 119/51.04, 51.11, 119/56.1; 222/409, 650

[56] References Cited

U.S. PATENT DOCUMENTS

| | | | |
|---|---|---|---|
| 2,242,576 | 5/1941 | Feilders | 222/361 |
| 3,578,209 | 5/1971 | Fraser | 222/650 X |
| 4,955,510 | 9/1990 | Newnan | 222/361 X |
| 5,299,529 | 4/1994 | Ramirez | 119/51.11 |

FOREIGN PATENT DOCUMENTS 673806  11/1963  Canada ................. 119/51.04

*Primary Examiner*—Robert P. Swiatek

[57] ABSTRACT

A timer controlled pet feeder for automatically dispensing a predetermined amount of pet food at a given time comprising a container having an openable main reservoir formed therein and adapted for holding several meals of pet food connected to a feeding reservoir formed therebelow and adapted for holding a meal of food with the feeding reservoir having an upwardly extended entrance for communicating with the main reservoir and a downwardly extended exit for providing communication therefrom; a dispensing mechanism having a retracted orientation for simultaneously closing the exit of the feeding reservoir and opening the entrance of the feeding reservoir and an extended orientation for simultaneously opening the exit of the feeding reservoir and closing the entrance of the feeding reservoir; an actuator mechanism for placing the dispensing mechanism in the extended orientation when activated and the retracted orientation when de-activated; and a timer mechanism for maintaining a current time and a plurality of triggerable time settings keyed to the current time and having one orientation for activating the actuator mechanism when a time setting is triggered and another orientation for de-activating the actuator mechanism when a time setting is not triggered.

3 Claims, 4 Drawing Sheets

TIMER CONTROLLED PET FEEDER

BACKGROUND OF THE INVENTION

1. Field of the Invention

The present invention relates to a timer controlled pet feeder and more particularly pertains to automatically dispensing a predetermined amount of pet food at a given time with a timer controlled pet feeder.

2. Description of the Prior Art

The use of pet food dispensers is known in the prior art. More specifically, pet food dispensers heretofore devised and utilized for the purpose of feeding pets are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,037,018 to Matsuda et al. discloses a automatic feeder. U.S. Pat. No. 5,072,695 to Newton et al. discloses an automatic fish feeder. U.S. Pat. No. 5,138,979 to Baird et al. discloses a wide range fish feeder. U.S. Pat. No. 5,139,864 to Lindauer discloses a multi-layer, multi-functional volatilizable substance delivery articles. U.S. Pat. No. 5,199,381 to Masopust discloses an automatic fish feeder.

While these devices fulfill their respective, particular objective and requirements, the aforementioned patents do not describe a timer controlled pet feeder that automatically dispenses a meal of pet food at a given time.

In this respect, the timer controlled pet feeder according to the present invention substantially departs from the conventional concepts and designs of the prior art, and in doing so provides an apparatus primarily developed for the purpose of automatically dispensing a predetermined amount of pet food at a given time.

Therefore, it can be appreciated that there exists a continuing need for new and improved timer controlled pet feeder which can be used for automatically dispensing a predetermined amount of pet food at a given time. In this regard, the present invention substantially fulfills this need.

SUMMARY OF THE INVENTION

In the view of the foregoing disadvantages inherent in the known types of pet food dispensers now present in the prior art, the present invention provides an improved timer controlled pet feeder. As such, the general purpose of the present invention, which will be described subsequently in greater detail, is to provide a new and improved timer controlled pet feeder and method which has all the advantages of the prior art and none of the disadvantages.

To attain this, the present invention essentially comprises, in combination, a rigid and generally L-shaped container having a hollow interior, an upwardly extended opening for allowing access to the interior, a pivotal lid securable over the opening, an inner wall horizontally extended across the interior and thereby defining a main reservoir positioned adjacent to the opening adapted for holding several meals of pet food therein and a base compartment positioned therebelow, and a feeding channel for communicating with the main reservoir formed of upper, intermediate, and lower spaced and aligned tubular sections extended downwards through the base compartment from the inner wall and terminated at a projected dispensing outlet. The feeding channel further includes a portion thereof defining a feeding reservoir adapted for holding a meal of pet food therein with the feeding reservoir having an entrance defined between the first and second sections and an exit defined between the second and third sections. A rigid and planar top platform is slidably disposed between the first and second sections of the feeding channel and has an upper aperture disposed thereon positionable over the entrance of the feeding reservoir. A rigid and planar bottom platform is included and slidably disposed between the second and third sections of the feeding channel at a location directly below the top platform and has a lower aperture disposed thereon positionable under the exit of the feeding reservoir and axially offset from upper aperture of the top platform. A rigid rail is coupled between the top platform and bottom platform for enabling simultaneous and congruent sliding of the platforms. A spring is included and has one end coupled to the bottom platform at a location remote from the rail and another end coupled to the container. The spring has a retracted orientation such that the lower aperture of the bottom platform is offset from the feeding channel and the upper aperture of the top platform is aligned with the feeding channel, thereby closing the exit of the feeding reservoir and opening the entrance of the feeding reservoir. The spring has an extended orientation such that the lower aperture of the bottom platform is aligned with the feeding channel and the upper aperture of the top platform is offset from the feeding channel, thereby opening the exit of the feeding reservoir and closing the entrance of the feeding reservoir. An articulated arm is disposed within the base compartment and has a base end and a tip end with the base end coupled to the rail. A power transmission cable is extended from the base compartment of the container and adapted for providing energy from an external electrical power source. An actuator is disposed within the base compartment and coupled to the tip end of the arm with the actuator adapted for pulling the rail thereto and thereby placing the spring in the extended orientation when energized and allowing the spring to return to the retracted orientation when de-energized.

Timer circuitry is disposed within the base compartment of the container and coupled to the power transmission cable and actuator. The timer circuity includes a timer for maintaining a current time and a plurality of triggerable time settings keyed to the current time. The timer circuity includes a timer switch having one orientation for energizing the actuator when a time setting is triggered and another orientation for de-energizing the actuator when a time setting is not triggered. The timer circuity includes timer adjustment means coupled to the timer and extended through the container for allowing a user to adjust the time and time settings. Lastly, the timer circuity includes a display extended through the container for displaying the current time and time settings.

A power switch is coupled to the power transmission cable and the timer circuitry with the power switch having one orientation for energizing the timer circuitry and another orientation for de-energizing the timer circuitry. When the timer circuitry is energized and a time setting is triggered, the actuator is energized such that the arm pulls on the rail and accompanying platforms to place the spring in the extended orientation, thus opening the exit of the feeding reservoir for allowing food to be dispensed through the dispensing outlet and simultaneously closing the entrance thereof. When a time setting is not triggered, the actuator is de-energized such that the spring returns to the retracted orientation, thus closing the exit of the feeding reservoir and simultaneously opening the entrance thereof for allowing it to be filled with another meal of pet food from the main reservoir for dispensing at a later time.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved timer controlled pet feeder which has all the advantages of the prior art pet food dispensers and none of the disadvantages.

It is another object of the present invention to provide a new and improved timer controlled pet feeder which may be easily and efficiently manufactured and marketed.

It is a further object of the present invention to provide a new and improved timer controlled pet feeder which is of durable and reliable construction.

An even further object of the present invention is to provide a new and improved timer controlled pet feeder which is susceptible of a low cost of manufacture with regard to both materials and labor, and which accordingly is then susceptible of low prices of sale to the consuming public, thereby making such a timer controlled pet feeder economically available to the buying public.

Still yet another object of the present invention is to provide a new and improved timer controlled pet feeder which provides in the apparatuses and methods of the prior art some of the advantages thereof, while simultaneously overcoming some of the disadvantages normally associated therewith.

Even still another object of the present invention is to provide a new and improved timer controlled pet feeder for automatically dispensing a predetermined amount of pet food at a given time.

Lastly, it is an object of the present invention to provide a new and improved timer controlled pet feeder comprising a container having an openable main reservoir formed therein and adapted for holding several meals of pet food connected to a feeding reservoir formed therebelow and adapted for holding a meal of food with the feeding reservoir having an upwardly extended entrance for communicating with the main reservoir and a downwardly extended exit for providing communication therefrom; dispensing means having a retracted orientation for simultaneously closing the exit of the feeding reservoir and opening the entrance of the feeding reservoir and an extended orientation for simultaneously opening the exit of the feeding reservoir and closing the entrance of the feeding reservoir; actuator means for placing the dispensing means in the extended orientation when activated and the retracted orientation when de-activated; and timer means for maintaining a current time and a plurality of triggerable time settings keyed to the current time and having one orientation for activating the actuator means when a time setting is triggered and another orientation for de-activating the actuator means when a time setting is not triggered; whereby when a time setting is triggered, the actuator means is activated, thus closing the entrance of the feeding reservoir and opening the exit thereof for allowing food to be dispensed therethrough, and when a time setting is not triggered, the actuator means is de-activated, thus closing the exit of the feeding reservoir and opening the entrance thereof for allowing it to be filled with another meal of pet food from the main reservoir for dispensing at a later time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
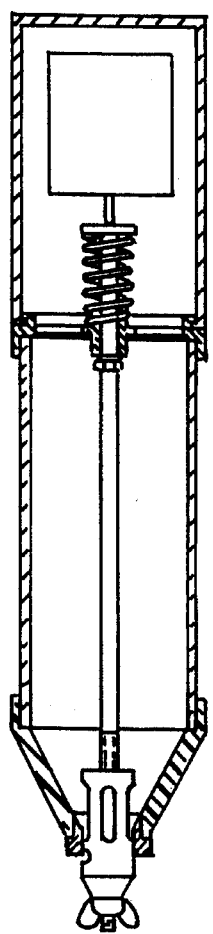
FIG. 1 is a cross-section view of a prior art wide range fish feeder.
Figure 2:
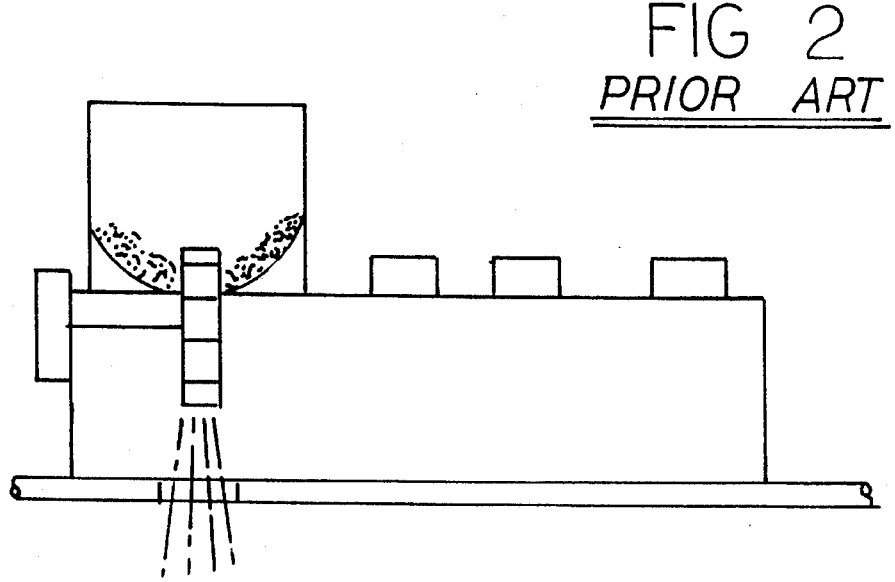
FIG. 2 is a cross-sectional view of a prior art automatic fish feeder.
Figure 3:
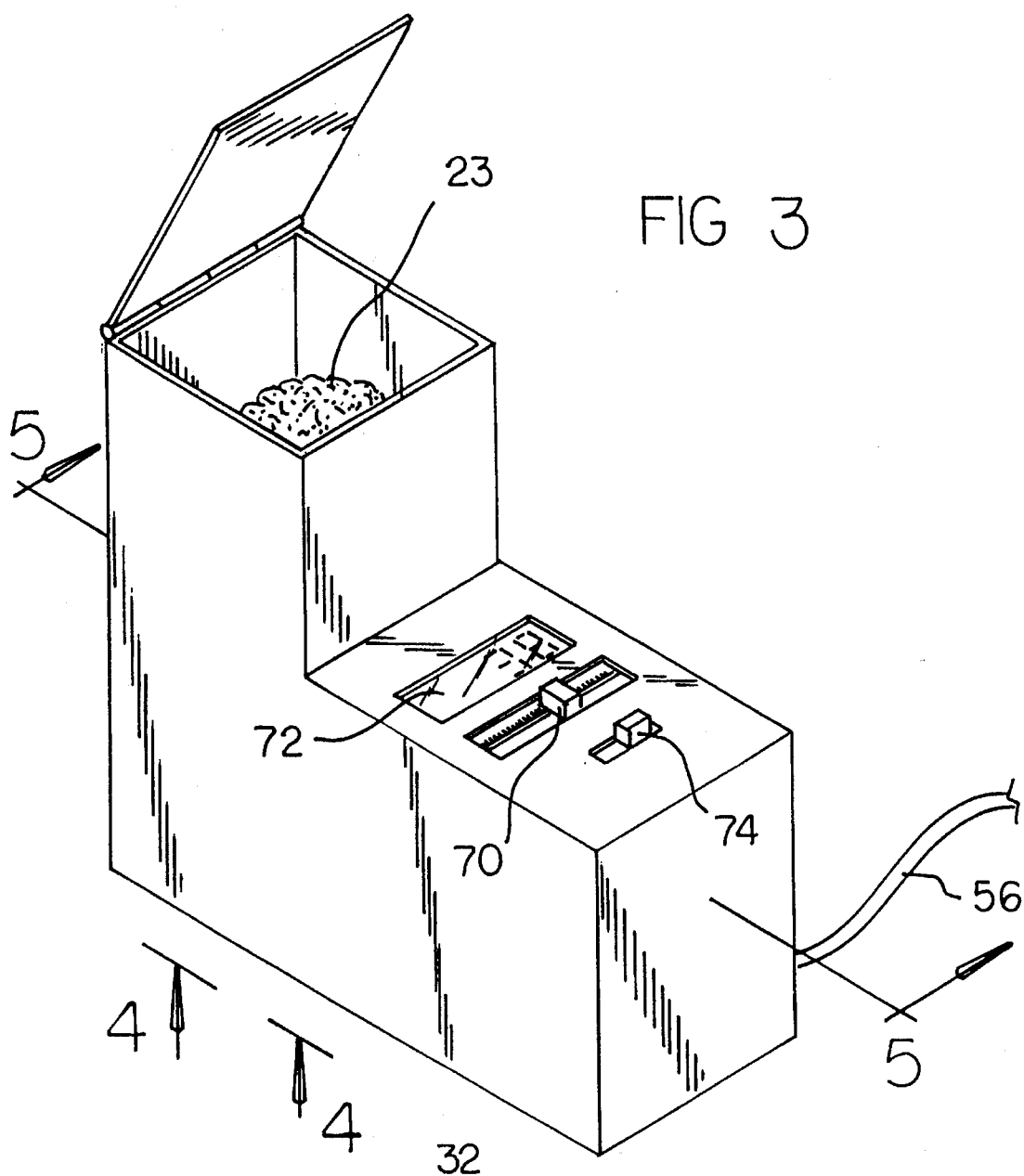
FIG. 3 is a perspective view of the preferred embodiment constructed in accordance with the principals of the present invention.
Figure 4:
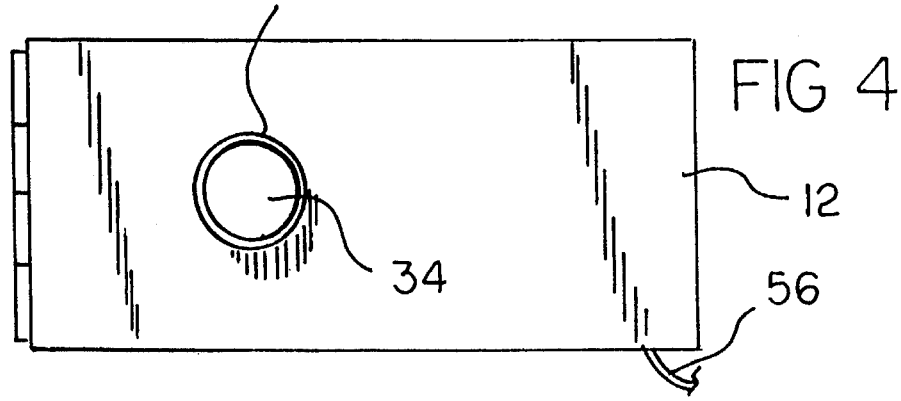
FIG. 4 is a view of the present invention taken along the lines 4—4 of FIG. 3.
Figure 5:
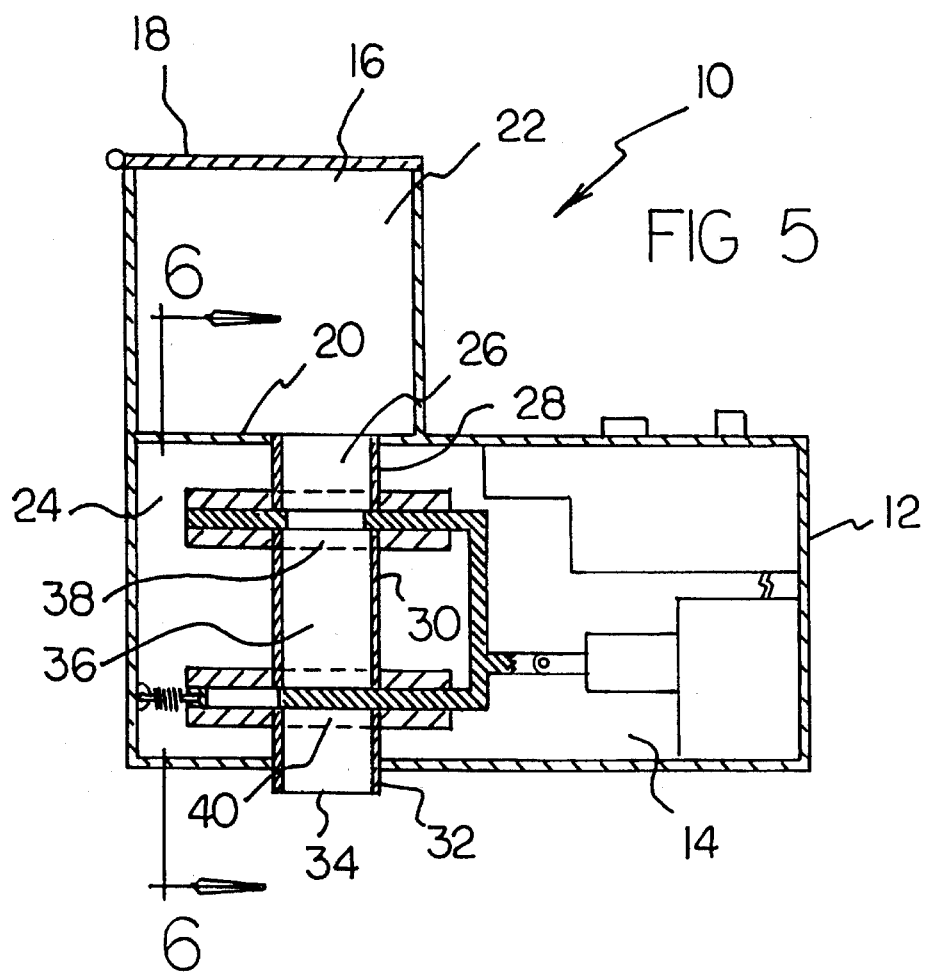
FIG. 5 is a cross-sectional view of the present invention taken along the lines 5—5 of FIG. 3.
Figure 6:
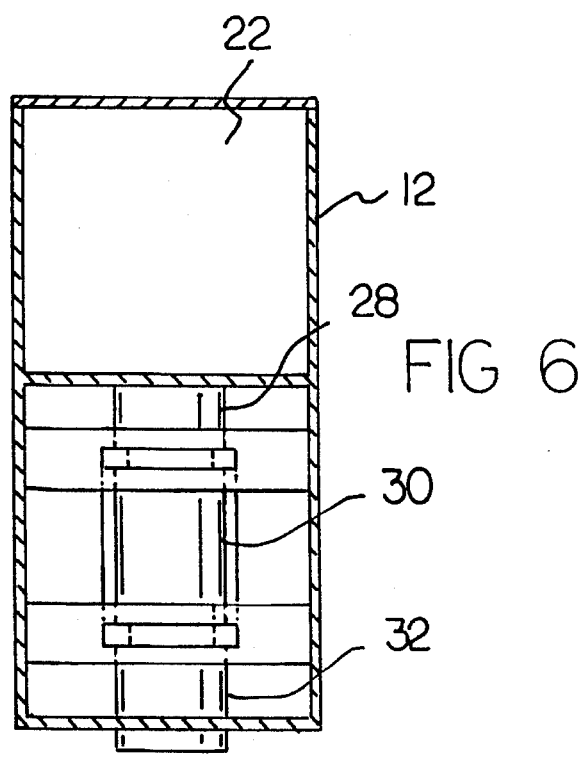
FIG. 6 is cross-sectional view of the present invention taken along the line 6—6 of FIG. 5.

With reference now to the drawings, and in particular, to FIG. 1 thereof, the preferred embodiment of the new and improved timer controlled pet feeder embodying the principles and concepts of the present invention and generally designated by the reference number 10 will be described.

Specifically, the present invention includes ten major components. The major components are the container, top platform, bottom platform, rail, spring, arm, power transmission cable, actuator, timer circuitry, and power switch. These components are interrelated to provide the intended function.

More specifically, it will be noted in the various Figures that the first major component is the container 12. The container is rigid and generally L-shaped in structure. It has a hollow interior 14 and an upwardly extended opening 16 for allowing access to the interior. The container also includes a pivotal lid 18 securable over the opening. An inner wall 20 is disposed within the interior and horizontally extended across the interior to define a main reservoir 22. The main reservoir is positioned adjacent to the opening. It is adapted for holding several meals of pet food 23 therein. A base compartment 24 is positioned below the main reservoir, The base compartment is used for holding major actuation components of the present invention therein. The container also includes a feeding channel 26 for communicating with the main reservoir. The feeding channel is formed of an upper tubular section 28, and intermediate tubular section 30, and a lower tubular section. These sections are spaced and aligned about a central axis. They are extended downwards through the base compartment from the inner wall. They are then terminated at a dispensing outlet 34. This dispensing outlet is projected from the bottom of the container. The feeding channel further has a portion thereof defining a feeding reservoir 36. The feeding reservoir is adapted for holding a meal of pet food 37 therein. This meal is first dispensed to the feeding reservoir from the main reservoir. The feeding reservoir has an entrance 38 defined between the first section and the second section. The feeding reservoir also has an exit 40 defined between the second section and the third section. The space between the first section and second section defines an upper slot. The space between the second section and third section defines a lower slot.

The second major component is the top platform 42. The top platform is rigid and planar in structure. It slidably disposed in the upper slot between the first section 28 and the second section 30 of the feeding channel. The platform has an upper aperture 44 disposed thereon. It is positionable over the entrance 38 of the feeding reservoir. Essentially, the upper aperture is approximately the same size as the cross-section of the feeding channel.

The third major component is the bottom platform 46. The bottom platform is rigid and planer in structure. It is slidably disposed in the lower slot between the second section 30 and the third section 32 of the feeding channel. It is positioned at a location directly below the top platform 42. The bottom platform has a lower aperture 48 disposed thereon. It is positionable under the exit 40 of the feeding reservoir. The size of the lower aperture is approximately equal to the size of the cross-section of the feeding channel. Additionally, the lower aperture is axially offset from the upper aperture 44 of the top platform. However, the apertures remain symmetrically aligned about a defined imaginary plane perpendicularly extended downwards through the platforms.

The fourth major component is the rail 50. The rail is rigid in structure. It is coupled between the top platform 42 and the bottom platform 46. The rail enables simultaneous and congruent sliding of the platforms within the slots when the rail is moved in a horizontal direction either in one given direction or the opposite direction. The rail also ensures that the spatial relationship of the lower aperture with respect to the upper aperture is maintained.

Figure 7:
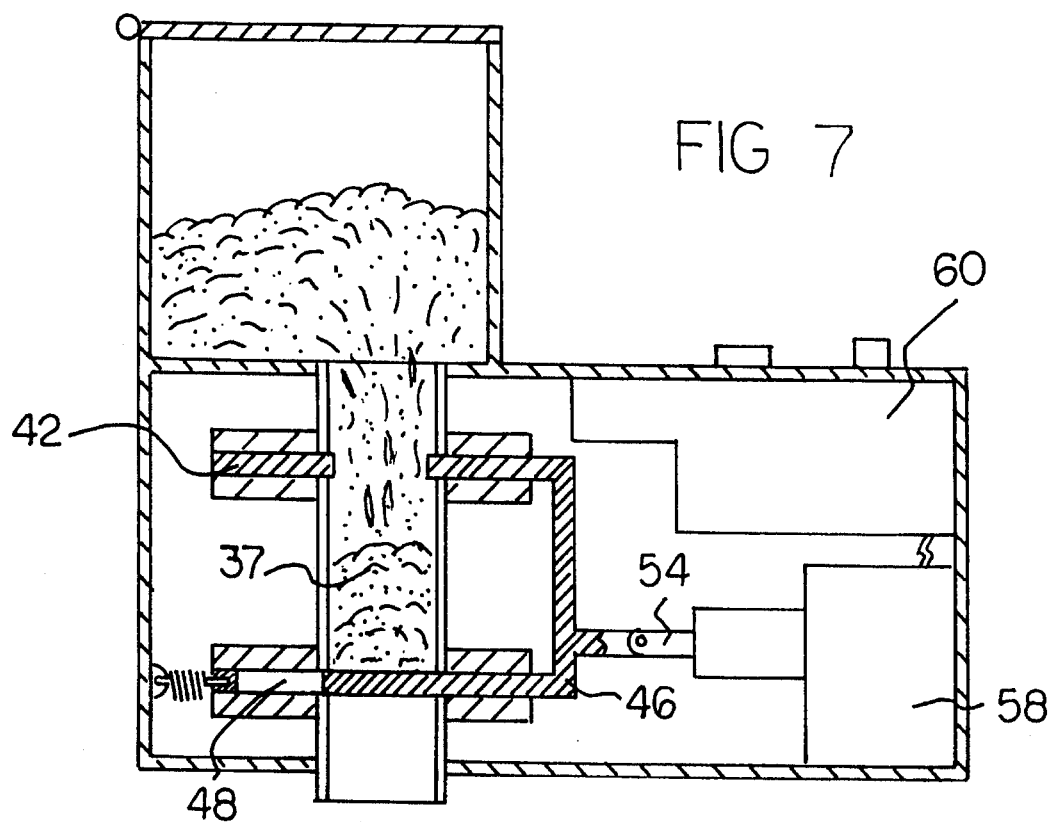
FIG. 7 is a cross-sectional view of the present invention depicting the disbursement of pet food into the feeding reservoir when the entrance thereto is open.
Figure 8:
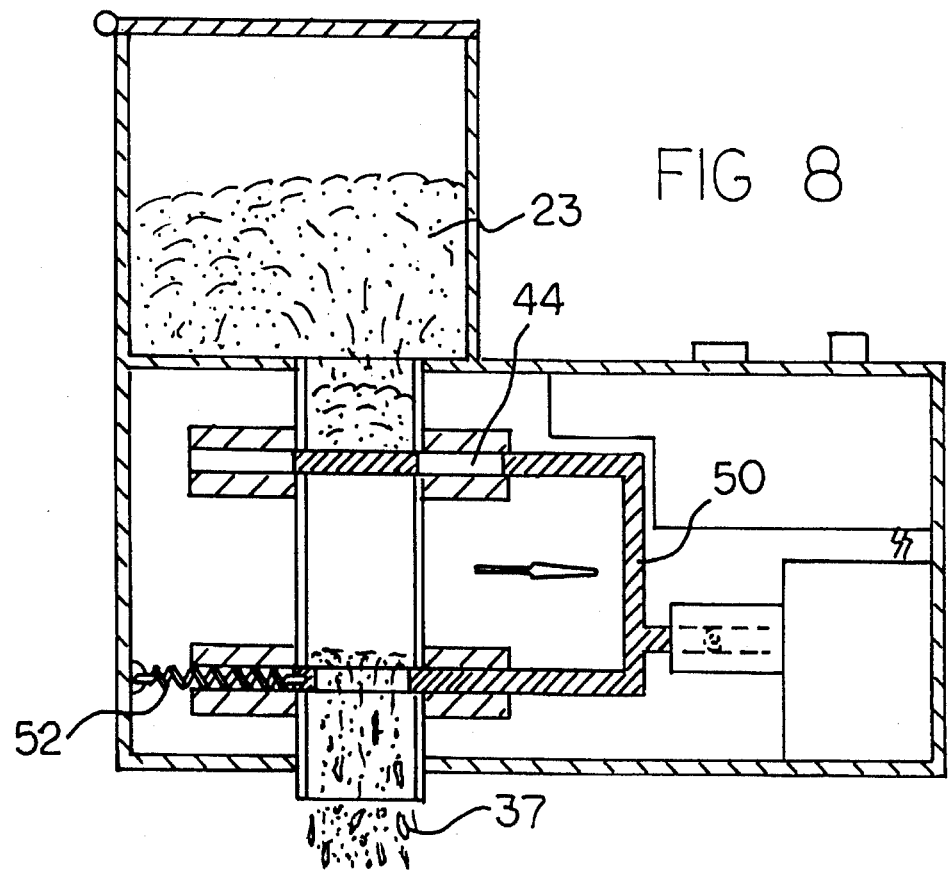
FIG. 8 is a cross-sectional view of the present invention with pet food being dispensed from the pet reservoir for feeding when the exit to the feeding reservoir is opened.

The fifth major component is the spring 52. The spring has one end coupled to the bottom platform 46 at a location remote from the rail. The other end of the spring is coupled to the container 12. The spring has a retracted orientation such that the lower aperture of the bottom platform is offset from the feeding channel and the upper aperture of the top platform is aligned with the feeding channel. This retracted orientation is shown in FIG. 7. In this position, the exit of the feeding reservoir is closed and the entrance to the feeding reservoir is opened. This position allows a meal of pet food to be disposed within the feeding reservoir. The spring further has an extended orientation such that the lower aperture of the bottom platform is aligned with the feeding channel and the upper aperture of the top platform is offset from the feeding channel. This position is depicted in FIG. 8. In this position, the exit of the feeding reservoir is opened and the entrance of the feeding reservoir is closed. This position allows the meal of pet food to be dispensed from the feeding reservoir while simultaneously preventing pet food from exiting the main reservoir.

The sixth major component is the arm 54. The arm is articulated in structure. It is disposed within the base compartment 24. The arm has a base end and a tip end. The base end is coupled to the rail 50. The arm essentially serves as a way of transferring force to the rail for sliding the platforms back and forth.

The seventh major component is the power transmission cable 56. The power transmission cable is extended from the base compartment 24 of the container. It is adapted for providing energy from an external electrical power source such as an conventional electrical wall socket.

The eighth major component is the actuator 58. The actuator is disposed within the base compartment 24 and coupled to the tip end of the arm 54. The actuator operates when electrically energized. When energized, the actuator is used for pulling the rail 50 thereto and thereby placing the spring 52 in the extended orientation. Thus, through the actuator, the platforms may be pulled forward. When de-energized, the actuator allows the spring to return to the retracted orientation without undo restriction.

The ninth major component is the timer circuitry 60. The timer circuitry is disposed within the base compartment 24 of the container. It is coupled to the power transmission cable 56 for receiving power therefrom for activation. It is also coupled to the actuator for allowing the actuator to be energized. The timer circuitry contains four subcomponents. The subcomponents are the timer, timer switch, timer adjustment beams, and display. These components are interrelated to allow the timer circuitry as a whole to perform its intended function.

The first subcomponent of the timer circuitry is the timer. The timer is adapted for maintaining a current time. It is also adapted for maintaining a plurality of triggerable time settings. These time settings are keyed to the current time. An indication is provided from the timer when a time setting corresponds to the current time.

The second subcomponent of the timer circuitry is the timer switch. The timer switch has one orientation for energizing the actuator when an indication is received that the time setting has been triggered. The timer switch also has another orientation for de-energizing the actuator when an indication is not received (that is, the time setting has not been triggered). The timer switch therefore controls the operation of the actuator based on an indication when a time setting is or is not in agreement with the current time.

The third subcomponent of the timer circuitry is the timer adjustment means 70. The timer adjustment means is coupled to the timer. The timer adjustment means essentially comprises circuitry adapted for adjusting the triggerable time settings as well as the current time. The timer adjustment means is also extended through the container 12. A portion of the timer adjustment means is extended though the container and essentially consists of switches for allowing the user to adjust the time and time settings as desired.

A fourth subcomponent of the timer circuitry is the display 72. The display is coupled to the timer and extended through the container. It is adapted for displaying the current time and time settings.

The tenth major component is the power switch 74. The power switch is coupled to the power transmission cable and the timer circuitry. The power switch has one orientation for energizing the timer circuitry, thereby indirectly allowing the actuator to be energized as directed therewith. The power switch has another orientation for de-energizing the timer circuitry. The power switch is extended through the container and adapted to be toggled by a user.

When the timer circuitry is energized and a time setting is triggered, the actuator is temporarily energized. The actuator provides a force to the arm which pulls the rail and accompanying platforms thereto. This force places the spring in the extended orientation, thus opening the exit of the feeding reservoir and allowing a meal of food to dispensed through the dispensing outlet. Furthermore, this force simultaneously closes the entrance of the feeding reservoir. Thus at a given time as set by the timer circuitry, a meal of food for a pet is dispensed. Upon completion of the triggering process after a set period of time, the actuator is de-energized. The spring then returns to its retracted orientation, thereby pulling the platforms and accompany rail thereto. This retraction process closes the exit of the feeding reservoir and simultaneously opens the entrance thereof. This allows the feeding reservoir to be filled with another meal of pet food from the main reservoir. In this fashion, a meal is ready to be dispensed at a later time as set in the timer circuitry.

The present invention allows pet food to be dispensed automatically according to the built-in-timer. The user can carry on with his/her normal activities, secure in the knowledge that the proper amount of food will be dispensed at the correct time. This is a great time-saver and also very handy for times when the pet's owner cannot be there in person to do the feeding.

The present invention has a plastic housing that has the general shape of an upper case "L". A timer and actuator are located in the horizontal section of the housing. The main food reservoir is in the top half of the vertical section. A feeding channel is located just below the main reservoir.

The key to the operation of the feeder is the sliding platform. This platform actually consists of two horizontal platforms at different heights. The actuator causes both platforms to move backward or forward simultaneously because they are part of the same molded piece of plastic. The two platforms are joined by a vertical plastic rail. Extending horizontally out from the opposite side of this vertical piece is a horizontal arm that is extended to the actuator. Thus, when the arm moves, both platforms move with it.

Each platform has an opening in it, but the openings are staggered so as not to line up with each other. In primary position, the aperture of the top platform allows food to fall from the main reservoir down into the feeding reservoir. However, the path from the feeding reservoir to the pet's dish or tank below is blocked by the bottom platform.

When the timer starts the actuator, the platforms pull back into secondary position. In this position, the hole on the lower platform lines up so that the path from the feeding reservoir to the dish or tank is open, and the food in that reservoir is thereby dispensed. However, the upper platform simultaneously blocks the path from the main food reservoir to the feeding reservoir at this time because the hole on the upper platform no longer lines up properly.

The main reservoir contains a large quantity of food-much larger than it would be healthy for a pet to eat at one sitting. The feeding reservoir is much smaller, designed to hold one meal's worth of food. A pullback spring pulls the two platforms back into their original position when the timer resets, which releases the actuator. This allows more food to fill the feeding reservoir from the main reservoir in preparation for the next feeding session. The present invention runs on 110-volt AC power. The amount of food dispensed by the feeding reservoir can be easily adjusted by changing its volume. This allows the user to customize the amount for different situations.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A timer controlled pet feeder for automatically dispensing a predetermined amount of pet food at a given time comprising, in combination:

a rigid and generally L-shaped container having a hollow interior, an upwardly extended opening for allowing access to the interior, a pivotal lid securable over the opening, an inner wall horizontally extended across the interior and thereby defining a main reservoir positioned adjacent to the opening adapted for holding several meals of pet food therein and a base compartment positioned therebelow, and a feeding channel for communicating with the main reservoir formed of upper, intermediate, and lower spaced and aligned tubular sections extended downwards through the base compartment from the inner wall and terminated at a projected dispensing outlet, the feeding channel further having a portion thereof defining a feeding reservoir adapted for holding a meal of pet food therein with the feeding reservoir having an entrance defined between the first and second sections and an exit defined between the second and third sections;

a rigid and planar top platform slidably disposed between the first and second sections of the feeding channel and having an upper aperture disposed thereon positionable over the entrance of the feeding reservoir;

a rigid and planar bottom platform slidably disposed between the second and third sections of the feeding channel at a location directly below the top platform and having a lower aperture disposed thereon positionable under the exit of the feeding reservoir and axially offset from upper aperture of the top platform;

a rigid rail coupled between the top platform and bottom platform for enabling simultaneous and congruent sliding of the platforms;

a spring having one end coupled to the bottom platform at a location remote from the rail and another end coupled to the container, the spring further having a retracted orientation such that the lower aperture of the bottom platform is offset from the feeding channel and the upper aperture of the top platform is aligned with the feeding channel, thereby closing the exit of the feeding reservoir and opening the entrance of the feeding reservoir, the spring further having an extended orientation such that the lower aperture of the bottom platform is aligned with the feeding channel and the upper aperture of the top platform is offset from the feeding channel, thereby opening the exit of the feeding reservoir and closing the entrance of the feeding reservoir;

an articulated arm disposed within the base compartment having a base end and a tip end with the base end coupled to the rail;

a power transmission cable extended from the base compartment of the container and adapted for providing energy from an external electrical power source;

an actuator disposed within the base compartment and coupled to the tip end of the arm with the actuator adapted for pulling the rail thereto and thereby placing the spring in the extended orientation when energized and allowing the spring to return to the retracted orientation when de-energized;

timer circuitry disposed within the base compartment of the container and coupled to the power transmission cable and actuator, the timer circuity further comprising:
 a timer for maintaining a current time and a plurality of triggerable time settings keyed to the current time;
 a timer switch having one orientation for energizing the actuator when a time setting is triggered and another orientation for de-energizing the actuator when a time setting is not triggered;
 timer adjustment means coupled to the timer and extended through the container for allowing a user to adjust the time and time settings; and
 a display extended through the container for displaying the current time and time settings; and a power switch coupled to the power transmission cable and the timer circuitry with the power switch having one orientation for energizing the timer circuitry and another orientation for de-energizing the timer circuitry;

whereby when the timer circuitry is energized and a time setting is triggered, the actuator is energized such that the arm pulls on the rail and accompanying platforms to place the spring in the extended orientation, thus opening the exit of the feeding reservoir for allowing food to be dispensed through the dispensing outlet and simultaneously closing the entrance thereof, and when a time setting is not triggered, the actuator is de-energized such that the spring returns to the retracted orientation, thus closing the exit of the feeding reservoir and simultaneously opening the entrance thereof for allowing it to be filled with another meal of pet food from the main reservoir for dispensing at a later time.

2. A timer controlled pet feeder for automatically dispensing a predetermined amount of pet food at a given time comprising:

a container having an openable main reservoir formed therein and adapted for holding several meals of pet food connected to a feeding reservoir formed therebelow and adapted for holding a meal of food with the feeding reservoir having an upwardly extended entrance for communicating with the main reservoir and a downwardly extended exit for providing communication therefrom;

dispensing means comprising an upper and lower platform integrally coupled by a rigid rail having a retracted orientation for simultaneously closing the exit of the feeding reservoir and opening the entrance of the feeding reservoir and an extended orientation for simultaneously opening the exit of the feeding reservoir and closing the entrance of the feeding reservoir;

actuator means for placing the dispensing means in the extended orientation when activated and the retracted orientation when de-activated;

timer circuitry disposed within the base compartment of the container, the timer circuity further comprising:
 a timer for maintaining a current time and a plurality of triggerable time settings keyed to the current time;
 a timer switch having one orientation for energizing the actuator when a time setting is triggered and another orientation for de-energizing the actuator when a time setting is not triggered;
 timer adjustment means coupled to the timer and extended through the container for allowing a user to adjust the time and time settings; and
 a display extended through the container for displaying the current time and time settings.

3. A timer controlled pet feeder as set forth in claim 2 further including switch means having one orientation for allowing time settings to be triggered and another orientation for preventing time settings from being triggered.

\* \* \* \* \*